United States Patent
Hewavithana et al.

(10) Patent No.: US 8,897,412 B2
(45) Date of Patent: Nov. 25, 2014

(54) METHOD AND APPARATUS FOR PHASE NOISE MITIGATION

(71) Applicants: Thushara Hewavithana, Hatfield (GB); Bernard Arambepola, Enfield (GB)

(72) Inventors: Thushara Hewavithana, Hatfield (GB); Bernard Arambepola, Enfield (GB)

(73) Assignee: Intel Corporation, Santa Clara, CA (US)

( * ) Notice: Subject to any disclaimer, the term of this patent is extended or adjusted under 35 U.S.C. 154(b) by 55 days.

(21) Appl. No.: 13/714,530

(22) Filed: Dec. 14, 2012

(65) Prior Publication Data

US 2014/0169434 A1 Jun. 19, 2014

(51) Int. Cl.
  *H04B 1/10* (2006.01)
  *H04L 27/01* (2006.01)
  *H04L 27/26* (2006.01)

(52) U.S. Cl.
  CPC ............ *H04L 27/01* (2013.01); *H04L 27/2647* (2013.01)
  USPC ............................ 375/375; 375/316; 375/346

(58) Field of Classification Search
  CPC .................................................. H04L 27/2647
  See application file for complete search history.

(56) References Cited

U.S. PATENT DOCUMENTS

| | | | | |
|---|---|---|---|---|
| 7,711,067 B2 * | 5/2010 | Hellberg | | 375/296 |
| 2006/0239367 A1 * | 10/2006 | Wilhelmsson et al. | | 375/260 |
| 2006/0262868 A1 * | 11/2006 | Leshem | | 375/260 |
| 2007/0025461 A1 * | 2/2007 | Park et al. | | 375/260 |
| 2007/0086533 A1 * | 4/2007 | Lindh | | 375/260 |
| 2007/0153927 A1 * | 7/2007 | Ma et al. | | 375/260 |
| 2007/0189403 A1 * | 8/2007 | Alletto et al. | | 375/260 |
| 2007/0218854 A1 * | 9/2007 | Lawrence et al. | | 455/310 |
| 2011/0103517 A1 * | 5/2011 | Hamalainen | | 375/316 |
| 2011/0237270 A1 * | 9/2011 | Noh et al. | | 455/450 |
| 2012/0076237 A1 * | 3/2012 | Cohen | | 375/297 |

* cited by examiner

*Primary Examiner* — Erin File

(74) *Attorney, Agent, or Firm* — Ellis B. Ramirez; PRASS LLP

(57) ABSTRACT

An approach is provided to mitigate phase noise by correcting common phase error and inter-carrier-interference in a received signal. The approach involves determining a received signal includes phase noise comprising at least a common phase error component and an inter-carrier-interference component. The approach also involves causing the common phase error to be corrected based on one or more pilot carriers. The approach further involves causing an estimate of a main signal component to be subtracted from the one or more pilot carriers. The approach additionally involves determining a sequence of estimated coefficients of a multiplicative phase noise sequence. The approach also involves causing the inter-carrier-inference to be corrected by processing the multiplicative phase noise sequence using the sequence of estimated coefficients. The approach further involves causing an equalized data signal to be output based on the corrected common phase error and the corrected inter-carrier-interference.

27 Claims, 9 Drawing Sheets

METHOD AND APPARATUS FOR PHASE NOISE MITIGATION

BACKGROUND

Service providers and device manufacturers (e.g., wireless, cellular, etc.) are continually challenged to deliver value and convenience to consumers by, for example, providing compelling network services. This often means providing high data rates achieved within current bandwidths by adopting higher order modulation schemes such as high order Quadrature amplitude Modulation (QAM) constellations. Furthermore, most modern communication systems use Orthogonal Frequency Division Multiplexing (OFDM) modulation. Phase noise caused by oscillators and analogue-to-digital converters in a transmitter-receiver chain leads to significant loss of performance in OFDM systems employing high order modulations.

Phase noise has two main effects on OFDM-communication systems: (1) the introduction of common phase error to OFDM data subcarriers, and (2) the injection of inter-carrier-interference.

Conventional phase noise mitigation methods often implemented in OFDM devices account for only the common phase error discussed above. But, severe phase noise distortions that give rise to inter-carrier-interference often render such conventional phase noise mitigation methods insufficient.

Some Example Embodiments

Therefore, there is a need for an approach to mitigate phase noise by correcting common phase error and inter-carrier-interference in a received signal.

According to one embodiment, a method comprises determining a received signal includes phase noise comprising at least a common phase error component and an inter-carrier-interference component. The method also comprises causing, at least in part, the common phase error to be corrected based, at least in part, on one or more pilot carriers. The method further comprises causing, at least in part, an estimate of a main signal component to be subtracted from the one or more pilot carriers.

The method additionally comprises determining a sequence of estimated coefficients of a multiplicative phase noise sequence. The method also comprises causing, at least in part, the inter-carrier-inference to be corrected by processing the multiplicative phase noise sequence using the sequence of estimated coefficients. The method further comprises causing, at least in part, an equalized data signal to be output based, at least in part, on the corrected common phase error and the corrected inter-carrier-interference.

According to another embodiment, an apparatus comprises at least one processor, and at least one memory including computer program code for one or more computer programs, the at least one memory and the computer program code configured to, with the at least one processor, cause, at least in part, the apparatus to determine a received signal includes phase noise comprising at least a common phase error component and an inter-carrier-interference component. The apparatus is also caused to cause, at least in part, the common phase error to be corrected based, at least in part, on one or more pilot carriers. The apparatus is further caused to cause, at least in part, an estimate of a main signal component to be subtracted from the one or more pilot carriers;

The apparatus is additionally caused to determine a sequence of estimated coefficients of a multiplicative phase noise sequence. The apparatus is also caused to cause, at least in part, the inter-carrier-inference to be corrected by processing the multiplicative phase noise sequence using the sequence of estimated coefficients. The apparatus is further caused to cause, at least in part, an equalized data signal to be output based, at least in part, on the corrected common phase error and the corrected inter-carrier-interference.

According to another embodiment, a computer-readable storage medium carries one or more sequences of one or more instructions which, when executed by one or more processors, cause, at least in part, an apparatus to determine a received signal includes phase noise comprising at least a common phase error component and an inter-carrier-interference component. The apparatus is also caused to cause, at least in part, the common phase error to be corrected based, at least in part, on one or more pilot carriers. The apparatus is further caused to cause, at least in part, an estimate of a main signal component to be subtracted from the one or more pilot carriers;

The apparatus is additionally caused to determine a sequence of estimated coefficients of a multiplicative phase noise sequence. The apparatus is also caused to cause, at least in part, the inter-carrier-inference to be corrected by processing the multiplicative phase noise sequence using the sequence of estimated coefficients. The apparatus is further caused to cause, at least in part, an equalized data signal to be output based, at least in part, on the corrected common phase error and the corrected inter-carrier-interference.

Exemplary embodiments are described herein. It is envisioned, however, that any system that incorporates features of any apparatus, method and/or system described herein are encompassed by the scope and spirit of the exemplary embodiments.

BRIEF DESCRIPTION OF THE DRAWINGS

The embodiments are illustrated by way of example, and not by way of limitation, in the figures of the accompanying drawings.

DESCRIPTION OF SOME EMBODIMENTS

Examples of a method, apparatus, and computer program to mitigate phase noise by correcting common phase error and inter-carrier-interference in a received signal are disclosed. In the following description, for the purposes of explanation, numerous specific details are set forth in order to provide a thorough understanding of the embodiments. It is apparent, however, to one skilled in the art that the embodiments may be practiced without these specific details or with an equivalent arrangement. In other instances, well-known structures and devices are shown in block diagram form in order to avoid unnecessarily obscuring the embodiments.

Figure 1:
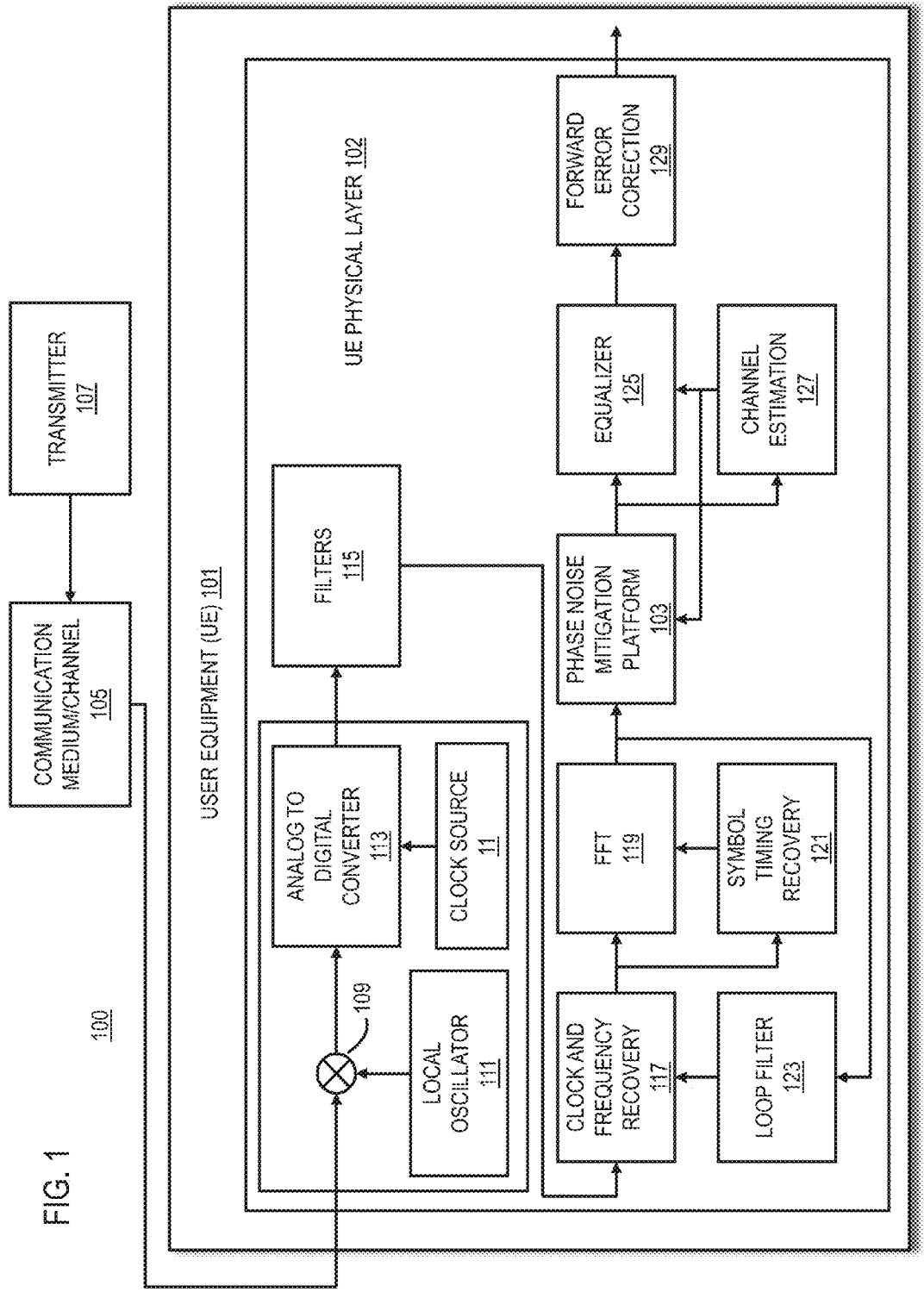
FIG. 1 is a diagram of a system capable of mitigating phase noise by correcting common phase error and inter-carrier-interference in a received signal, according to one embodiment.

FIG. 1 is a diagram of a system capable of mitigating phase noise by correcting common phase error and inter-carrier-interference in a received signal, according to one embodiment.

Modern communication systems use Orthogonal Frequency Division Multiplexing (OFDM) modulation. Phase noise caused by oscillators and analogue-to-digital converters in a transmitter-receiver chain leads to significant loss of performance OFDM systems employing high order modulations such as high order QAM constellations.

Phase noise in OFDM is conventionally mitigated using common phase error correction. In this conventional scheme, a single phase offset value is subtracted from phase angles of all OFDM data carriers resulting from a Fast Fourier Transform (FFT). However, phase noise also gives rise to inter-carrier-interference. This inter-carrier-interference is not mitigated by common phase error correction. The effect of inter-carrier-interference becomes significant when high order QAM constellations are used to increase data rates. These high constellations require high signal to noise ratios (SNR). Inter-carrier-interference then acts as a noise floor in the system. In some cases this inter-carrier-interference noise floor may prevent high signal to noise ratios to be achieved, and thereby prevent reception altogether. In other cases inter-carrier-interference can severely degrade the signal to noise ratio, thereby requiring very high power levels to enable reception.

Although the above comments refer to high order constellations like QAM1024, QAM4096 and QAM16384, phase noise can be a problem even with lower order constellations such as QAM256 in system-on-a-chip devices, for example. There is a trend to integrate the analog tuner, mixed-signal and digital baseband circuits in the same system-on-a-chip device to reduce overall system cost. The analog tuner and mixed-signal circuits in system on chips may not be high quality, and thus, may have poor phase noise performance. This poor phase noise performance accordingly causing reception problems to even lower order constellations such as QAM256.

To address this problem, a system 100 of FIG. 1 introduces the capability to mitigate phase noise by correcting common phase error and inter-carrier-interference in a received signal.

As shown in FIG. 1, the system 100 comprises one or more user equipment (UE) 101 having a UE physical layer 102 that includes at least a phase noise mitigation platform 103 and a transmitter 107 having connectivity to the UE 101 by way of a communication medium or channel 105. According to various embodiments the UE physical layer 102 may additionally comprise a tuner 109, a local oscillator 111, an analog to digital converter 113 and a clock source 114. In some embodiments, the UE physical layer 102 may further comprise any combination of filters 115, a clock and frequency recovery module 117, a FFT module 119, a symbol timing recovery module 121, a loop filter 123, an equalizer 125, a channel estimation module 127 and a forward error correction module 129.

According to various embodiments, the transmitter 107 may include low density parity check code (LDPC) encoders and OFDM modulator, for example. Continuous pilots amounting to about 1% of the total carriers of a signal to be transmitted by the transmitter 107 are often introduced to the transmitted signal to enable clock and frequency recovery by the UE 101 using the clock and frequency recovery module 117, for example, and the first stage of phase noise mitigation, common phase error, by the phase noise mitigation platform 103. Scattered pilots enable channel estimation at the channel estimation module 127 and equalization by the equalizer 125, for example. Phase noise mitigation platform 103, accordingly, can use all the pilots (i.e. continuous pilots and scattered pilots) to do the second stage of phase noise mitigation, which is mitigating or canceling the above-discussed inter-carrier-interference. In some embodiments, only the continuous pilots are used for the common phase error correction portion of the phase noise mitigation processes discussed herein.

Signals transmitted by transmitter 107 are received by the UE 101 by way of the communication medium 105 having passed through the transmitter 107 and UE 101 RF front ends and the communication medium 105, which includes a propagation channel such as, for example, a cable network or wireless network as discussed in more detail below. The transmitted signals often include any combination of additive noise, multi-path echoing, and phase noise, among other channel impairments as a result of passing through receiver front end modules such as the tuner 109 and analog to digital converter 113 for example. Tuner phase noise comes from frequency jitter of the local oscillator 111. Phase noise may also be introduce by any analog to digital converter 113 sampling rate jitter, which is caused by imperfections in local clock source 114. While the discussion below incorporates compensation for multi-path echoing as an example, the phase noise mitigation platform 103 is configured to cause the discussed phase noise mitigation to occur with or without the presence of additive noise, multi-path errors, or any other channel impairments.

By way of example, though the system 100 and the example calculations below are discussed with regard to HFC communications for simplicity and understanding, the communication medium 105 of system 100 includes one or more networks such as a wired data network, a wireless network, a telephony network, or any combination thereof. It is contemplated that the data network may be any local area network (LAN), metropolitan area network (MAN), wide area network (WAN), a public data network (e.g., the Internet), short range wireless network, or any other suitable packet-switched network, such as a commercially owned, proprietary packet-switched network, e.g., a proprietary cable or fiber-optic network, and the like, or any combination thereof. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., worldwide interoperability for microwave access (WiMAX), Long Term Evolution (LTE) networks, code division multiple access (CDMA), wideband code division multiple access (WCDMA), wireless fidelity (WiFi), WiGig, wireless LAN (WLAN), Bluetooth®, Internet Protocol (IP) data casting, satellite, mobile ad-hoc network (MANET), and the like, or any combination thereof.

The UE 101 is any type of mobile terminal, fixed terminal, or portable terminal including a mobile handset, station, unit, device, multimedia computer, multimedia tablet, Internet node, communicator, desktop computer, laptop computer, notebook computer, netbook computer, tablet computer, personal communication system (PCS) device, personal navigation device, personal digital assistants (PDAs), audio/video player, digital camera/camcorder, positioning device, television receiver, radio broadcast receiver, electronic book device, game device, set-top-box, or any combination thereof, including the accessories and peripherals of these devices, or any combination thereof. It is also contemplated that the UE 101 can support any type of interface to the user (such as "wearable" circuitry, etc.).

In one or more embodiments, the system 100 is configured to conduct phase noise inter-carrier-interference compensation in OFDM based systems in application to a WiGig OFDM physical layer (OFDM PHY), for example. A transmitted signal may be sent between any number of UE 101's and/or any number of transmitters 107. Additionally, one UE 101 or transmitter 107 may be a transmitting side of the transmitted signal, while another UE 101 may be a receiving side of the transmitted signal.

In one or more embodiments, the phase noise mitigation platform 103 is configured to mitigate phase noise by way of common phase error correction and inter-carrier-interference cancellation. In various embodiments, inter-carrier-interference cancellation may be a complete cancellation or a mitigation of the inter-carrier-interference based on an estimate of the inter-carrier interference as determined by the phase noise mitigation platform 103. To accomplish this, the phase noise mitigation platform 103 is configured to apply one or more algorithms to facilitate phase noise determination and mitigation by cancelling out determined or estimated values for common phase error and inter-carrier-interference that may be precise or estimated values. The phase noise mitigation platform 103 is configured to apply these algorithms without any additional standardization assistance to mitigate phase noise, thereby keeping the usage of system resources to a minimum saving any combination of time, memory, and power. In embodiments, the phase noise mitigation platform 103 is configured to make use of the small number of pilots that are conventionally included in OFDM transmissions to enable synchronization and equalization.

For example, according to various embodiments, the phase noise mitigation platform 103 may determine and mitigate phase noise in a received OFDM data signal y(i). The signal y(i) is, for example, a signal that results after an ideal signal d(i), which has no impairments such as phase noise added to the it, is transmitted by the transmitter 107 and passes through a multi-path channel such as communication medium 105. To determine signal y(i), the signal d(i) having passed through the multi-path channel may be defined by an impulse response h(u). The effect of phase noise on the received signal may then be represented by multiplying the received signal by an oscillator phase noise exponential exp(jφ(i)), where φ(i) is a sampled phase noise sequence. The transmitted OFDM data signal may also be convolved with the channel impulse response to give a multipath channel output:

$$x(i) = \Sigma h(u)d(i-u) \qquad (1)$$

The effect of phase noise can accordingly be modeled as a multiplication of the multipath channel output x(i) by the oscillator phase noise exponential to yield the received signal y(i) having phase noise:

$$y(i) = x(i)\exp(j\phi(i)) \qquad (2)$$

The resulting signal y(i) represents the signal received at the FFT module 119, discussed above, after passing through the tuner 109 and analog to digital converter 113, the filters 115 and at least the clock and frequency recovery module 117 of the UE physical layer 102. The signal y(i) is then subjected to an OFDM Fast Fourier Transform (FFT) by the FFT module 119 outputting Y(k), discussed below.

When the FFT module 119 conducts the OFDM demodulation process, the FFT module 119 takes the FFT of y(i), this multiplication of phase noise ends up as a cyclic convolution at the output of the FFT module 119. It is assumed that any symbol timing recovery is done by the symbol timing recovery module 121 so as to trigger an N-point OFDM FFT within the cyclic prefix guard interval to minimize any inter-symbol-interference so as to yield:

$$Y(k) = X(k) \otimes P(k) = (D(k)H(k)) \otimes P(k) \qquad (3)$$

In equation (3), $\otimes$ is the cyclic convolution operator, and $$P(k) = \text{FFT}\{\exp(j\phi(i))\} \qquad (4)$$

Equation (3) may be expanded as:

$$Y(k) = D(k)H(k)P(0) + \sum_{n \neq 0} P(n)D(k-n)H(k-n) \qquad (5)$$

In the above equation (5), P(0) is the DC component of phase noise within the OFDM symbol duration:

$$P(0) = N^{-1}\Sigma\exp(j\phi(i)) \qquad (6)$$

For small phase angles this equation may be approximated by:

$$P(0) \approx \exp(jN^{-1}\Sigma\phi(i)) \qquad (7)$$

To get P(0), the phase noise mitigation platform 103 determines the average of all the phase angles of continuous pilots (CP's). Continuous pilots are pilots that occur at the same carrier location in all symbols. These continuous pilots are often helpful in achieving frequency and timing synchronization, for example, as conducted by the clock and frequency recovery module 117. Continuous pilots, however, can be also used for common phase error correction, using a known algorithm described below. Accordingly, phase noise mitigation platform 103 applies:

$$\hat{\phi} = \text{mean}(\{\text{phase angles of CP's}\}) \qquad (8)$$

$$P(0) = \exp(j\hat{\phi}) \qquad (9)$$

Because the continuous pilots will have a phase component corresponding to multi-path errors, the phase noise mitigation platform 103 may take the difference of phase angles of the same continuous pilot in two successive symbols. This removes the effect of the multi-path errors, which the phase noise mitigation platform 103 considers to be invariant over two successive symbols. The differentiation above is compensated for by the phase noise mitigation platform 103 by an integration to yield equation (9).

The phase noise mitigation platform 103 then divides equation (5) by the inverse of P(0) yielding:

$$Y(k) = \frac{Y(k)}{P(0)} = D(k)H(k) + \sum_{n \neq 0} \left(\frac{P(n)}{P(0)}\right)D(k-n)H(k-n) \qquad (10)$$

It should be noted, however, that it may not be necessary to conduct a division operation to implement common phase error correction operation given in equation (10) above. For example, as shown from equation (9), P(0) is a phasor with an amplitude of 1. Therefore $$\frac{1}{P(0)} = P^*(0),$$

where * denotes complex conjugate operation. This function accordingly transforms division in (10) to a multiplication yielding equation (11) below $$\cdot \frac{Y(k)}{P(0)} = Y(k)P^*(0) \quad (11)$$

The phase noise mitigation platform 103 corrects the common phase error in the OFDM data signal by way of the transformation of equation (5) to equation (10). Equation (10) is the common phase error correction output by the phase noise mitigation platform 103. To further improve phase noise mitigation, the output of the common phase error correction is processed by the phase noise mitigation platform 103 to cancel any inter-carrier-interference component of the phase noise. Accordingly, if the main signal component is removed from phase noise inter-carrier-interference affected signal, i.e. the first term in the right hand side of the above equation (outside summation), the summation term in equation (10) is representative of the inter-carrier-interference. This is the impact of the carriers {(D(m) H(m)), m≠k} on the carrier (D(k) H(k)), for example. The multiplication by the channel frequency response H(k) is shown here to illustrate the fact that the carriers have not yet been equalized. The inter-carrier-interference part of equation (10) is a linear combination of neighboring carriers via coefficients:

$$\hat{P}(n) = \frac{P(n)}{P(0)} \quad (12)$$

Referring back to equation (4), and recalling that P(n) values are the Fourier coefficients of the multiplicative phase noise sequence, the phase noise mitigation platform 103 yields equation (12) which is the normalization of these coefficients with reference to the DC value. So, if the coefficients $\hat{P}(n)$ are known then the phase noise mitigation platform 103 can process the second term of equation (10) to estimate the inter-carrier-interference such that it can be canceled, or sufficiently canceled. The inter-carrier-interference coefficients are complex-values and change completely from one symbol to another.

To determine the inter-carrier-interference coefficients, the phase noise mitigation platform 103 processes an instruction indicating how many significant coefficients there are to resolve, i.e. the value of L in the equation below:

$$Y(k) = D(k)H(k) + \sum_{\substack{n=-L \\ n \neq 0}}^{n=+L} \hat{P}(n)D(k-n)H(k-n) \quad (13)$$

According to various embodiments, the term L in equation (13) represents the set of inter-carrier-interference coefficients. When resolving equation (12), that a value of L=4 is sufficient for estimating the inter-carrier-interference that is to be canceled. Simulations have confirmed that this value of L is a good compromise between complexity and performance. If L=4, implementing equation (13) is not that complicated. For example, it is equivalent to applying an 8-tap FIR filter. But, depending on system resources, any number of coefficients may be resolved. For example, in some embodiments, if L=4, then +L and −L are resolved yielding 8 coefficients. If L=2, then +L and −L are resolved yielding 4 coefficients. And, as discussed below, considering a negative conjugate property of $\hat{P}(k)$, then if L=2, only L=2 needs to be resolved, yielding only 2 initial coefficients, that are then negated and conjugated to yield the negative half of the equation. In other embodiments, L may be greater than, or equal to 6 yielding up to at least 12 coefficients, etc.

Although the correction is not complicated, the coefficient sequence $\hat{P}(n)$ estimated by the phase noise mitigation platform 103 for every symbol, yielding:

$$E(k) = D(k)H(k) \quad (14)$$

This E(k) is the signal sequence before equalization, accordingly from equation (10):

$$Y(k) = E(k) + \sum_{\substack{n=-L \\ n \neq 0}}^{n=+L} \hat{P}(n)E(k-n) \quad (15)$$

Any attempt to simply estimate $\hat{P}(n)$ from the above equation may lead to difficulties and dynamic range problems because the term E(k) outside the summation is far larger than any of the terms of the summation. So to overcome this problem, the phase noise mitigation platform 103 makes use of the pilots, discussed above.

For example, if S is the set of indices of carriers corresponding to the pilots, then {D(k), k∈S} is known because these are pilots. The phase noise mitigation platform 103 takes the channel frequency response estimate from the preceding symbol. This does not mean, however, that the channel estimate for the current symbol has to be the same as that for the preceding symbol. The channel frequency response may not change by a large amount much from one symbol to the next. As such, the phase noise mitigation platform 103 can determine an estimate for {E(k), k∈S} using:

$$\hat{E}(k) = D(k)H_{previous\_symbol}(k); k \in S \quad (16)$$

Next, the phase noise mitigation platform 103 subtracts this estimate from equation (15) thereby providing:

$$\tilde{Y}(k) = Y(k) - \hat{E}(k) = (E(k) - \hat{E}(k)) + \sum_{\substack{n=-L \\ n \neq 0}}^{n=+L} \hat{P}(n)E(k-n); k \in S \quad (17)$$

and accordingly:

$$\tilde{Y}(k) = \varepsilon(k) + \sum_{\substack{n=-L \\ n \neq 0}}^{n=+L} \hat{P}(n)E(k-n); k \in S \quad (18)$$

It should be noted that although $\epsilon(k) = (E(k) - \hat{E}(k))$ is non-zero, it is not a large value. Therefore, it will not drown the small values in the summation of the second term in the right hand side of the above equation. This enables an accurate determination of $\{\hat{P}(n)\}$. In equations (16-19) all the pilots may be used, including both continuous pilots and scattered pilots.

To determine $\hat{P}(n)$, the phase noise mitigation platform 103 is configured to assume that the data carriers are uncorrelated, which implies:

$$\Sigma E(u)E^*(v) = 0; u \neq v \qquad (19)$$

In equation (19) (*) denotes the complex conjugate.

For practical purposes the equation (19) is applicable provided the summation is taken over a large enough set such as FFT sizes on the order of 4K, 8K and 16K where approximately 1% to 2% of these carriers are pilots.

The phase noise mitigation platform 103 then multiplies equation (18) by $E^*(k-m)$ and sums this over the set S, yielding:

$$\sum_{k \in S} \tilde{Y}(k) E^*(k-m) = \qquad (20)$$

$$\sum_{k \in S} \varepsilon(k) E^*(k-m) + \sum_{\substack{n=-L \\ n \neq 0}}^{L} \sum_{k \in S} \hat{P}(n) E(k-n) E^*(k-m)$$

From the previous equation, the summation over set S provides a non-zero value in the right hand side only when m=n, hence:

$$\sum_{k \in S} \tilde{Y}(k) E^*(k-m) = \hat{P}(m) \sum_{k \in S} E(k-m) E^*(k-m) \qquad (21)$$

and $$\hat{P}(m) = \frac{\sum_{k \in S} \tilde{Y}(k) E^*(k-m)}{\sum_{k \in S} |E(k-m)|^2} \qquad (22)$$

If the set S is large enough, the phase noise mitigation platform 103 may approximate the denominator by a constant corresponding to the average power of a received pilot carrier, for example, to avoid the division operation. But, if the set is not that large, the phase noise mitigation platform 103 may approximate the denominator, for example, by:

$$\sum_{k \in S} |E(k-m)|^2 = C(1+\delta) \qquad (23)$$

$$\hat{P}(m) = C^{-1}(1-\delta) \sum_{k \in S} \tilde{Y}(k) E^*(k-m) \qquad (24)$$

In embodiments, the inverse of the constant C is saved also as a constant and equation (22) may be implemented without a division operation (assuming $O(\delta^2)$ terms of the power series are zero).

The phase noise mitigation platform 103, in view of the foregoing, determines the inter-carrier-interference coefficients, for example, based on an appropriate L value of 4 providing $4 \geq m \geq -4$. The determined inter-carrier-interference coefficients are then processed by the phase noise mitigation platform 103 and are used to populate equation (13) to determine the inter-carrier-interference corrected data carriers:

$$D(k)H(k) = Y(k) - \sum_{\substack{n=-L \\ n \neq 0}}^{n=+L} \hat{P}(n) D(k-n) H(k-n) \qquad (25)$$

Phase noise mitigation platform 103 then causes the resulting inter-carrier-interference corrected data carriers {D(k) H(k)} to be sent to the channel estimation module 127 to estimate channel frequency response, H(k), for the current OFDM symbol and to the equalizer module 125 for equalization. The equalization provides the data signal {D(k)} after equalizing for the channel frequency response {H(k)} is completed.

It should be noted that the above algorithms do not rely on any feedback from an equalizer or a forward error correction module. As such, the above processes have very little or no impact on the latency of the system as a whole. Also, storage complexities and related memory requirements associated with feedback may also be avoided.

According to various embodiments, the inter-carrier-interference cancellation may be further improved beyond that based solely on the discussion above. For example, in one embodiment, the phase noise mitigation platform 103 may perform an iterative parameter estimation. The subtraction of the estimated value of the primary component, shown in equation (17), provides better parameter estimation. If this is not done, the equation is dominated by the primary component preventing the estimation of smaller inter-carrier-interference components. Subtraction of the primary component leaves a smaller primary value $\epsilon(k)$ in equation (18). This enables the smaller components within the summation to be estimated.

Accordingly, this process can be continued and the inter-carrier-interference correction may be further improved. For example, once the inter-carrier-interference coefficient $\hat{P}(1)$ is estimated, the phase noise mitigation platform 103 may subtract its contribution $\hat{P}(1)E(k-1)$ from equation (18). This enables subsequent coefficients $\hat{P}(2), \hat{P}(3), \ldots$ to be estimated more accurately. Once an inter-carrier-interference coefficient is estimated, the contribution from this is subtracted to enable the next parameter to be estimated more accurately.

In another embodiment, one that may be in addition to the above embodiments, the phase noise mitigation platform 103 may ensure unit modulus of the phase noise exponential vector in the time domain. The sequence {P(n)} is the FFT of a sequence of the form {exp(j$\phi$(i))}, discussed above. So the time domain sequence, i.e. the Fourier-inverse of {P(n)} should have unity magnitude. The phase noise mitigation platform 103, therefore, may be configured to improve the estimate of {P(n)} by forcing this criterion. To do this, the phase noise mitigation platform 103 computes the IFFT of the sequence {P(n)} and then forces the amplitude of all the components of this to unity. The phase noise mitigation platform 103 then computes the FFT to give a new sequence {P(n)}.

This added feature is useful, but it is relatively resource intensive because it requires processing an FFT and an inverse FFT. However, in some embodiments, the phase noise mitigation platform 103 may be configured to use the properties of the phase noise profile to enforce unit modulus condition without using the IFFT/FFT approach discussed above. For example, instead of doing the IFFT and FFT, so as to reduce phase noise mitigation platform 103's impact on system resources, the phase noise mitigation platform 103 imposes a "negative conjugate symmetry" property to the inter-carrier-interference coefficients that were used to filter out the inter-carrier-interference, determined above. The result of the computation using the negative conjugate symmetry property is equivalent to forcing the amplitude of time domain phase noise coefficients to unity using the IFFT/FFT approach discussed above. If this "negative conjugate symmetry" property is used by the phase noise mitigation platform 103 to improve the accuracy of the inter-carrier-interference coefficient estimates, processing by the phase noise mitigation platform 103 may be further simplified, for example, by only determining the positive half of determinable coefficients for an L value of 4, discussed above.

In other words, this property enables the phase noise mitigation platform 103 to estimate only 4 parameters, instead of 8 (i.e. if L=4, then coefficients are determined in other embodiments for L=−4 to L=+4), using the same amount of information. The application of the "negative conjugate symmetry" may also improve estimation accuracy because there are fewer variables in the equation which could introduce error. Accordingly, the following relationship between the inter-carrier-interference coefficients for negative and positive indices may be used by the phase noise mitigation platform 103, $$\hat{P}(-k) = -\hat{P}^*(k) \tag{26}$$

As such, this simpler approach to impose the "negative conjugate symmetry" condition may be conducted by the phase noise mitigation platform 103 by averaging the coefficients as given in equations (27) below to give improved coefficients accuracy.

$$\hat{P}(k) = \frac{\hat{P}(k) - \hat{P}^*(-k)}{2} \tag{27}$$

Alternatively, equation (22) can be improved to incorporate negative conjugate symmetry property and estimating only half of the coefficients (for positive m values only) but still using all the data used for estimation of a full set of coefficients in equation (22).

$$\hat{P}(m) = \frac{\sum_{k \in S}\left[\tilde{Y}(k)E^*(k-m) - \tilde{Y}^*(k)E(k+m)\right]}{\sum_{k \in S}\left[|E(k-m)|^2 + |E(k+m)|^2\right]} \tag{28}$$

Equation (28) may be used to estimate inter-carrier-interference coefficients for positive values of m which results in better accuracy because the number of terms in correlations (addition) are doubled. Then equation (26) gives coefficients for negative m values.

As discussed above, the "negative conjugate symmetry" property of the filter coefficients (equation (26)) also almost halves the filter complexity, thereby simplifying the inter-carrier-interference cancellation process. For example, if equation (25) is applied to equation (14) discussed above:

$$E(k) = D(k)H(k) \tag{14}$$

Then, equation (26) may be transformed to:

$$E(k) = Y(k) - \sum_{\substack{n=-L \\ n \neq 0}}^{n=+L} \hat{P}(n)E(k-n) \tag{29}$$

Additionally, the "negative conjugate symmetry" property of equation (26) implies:

$$Re(\hat{P}(-n)) = -Re(\hat{P}(n)) \tag{30a}$$

and $$Im(\hat{P}(-n)) = Im(\hat{P}(n)) \tag{30b}$$

Here Re(.) and Im(.) refer to the real and imaginary parts of the complex number and equation (29) accordingly becomes:

$$E(k) = Y(k) - \sum_{n=1}^{n=+L} Re(\hat{P}(n))(E(k+n) - E(k-n)) + \\ jIm(\hat{P}(n))(E(k+n) + E(k-n)) \tag{31}$$

Equation (31) illustrates the halving of the number of multiplications processed by the phase noise mitigation platform 103, which in turn, reduces the consumption of system resources for correcting inter-carrier-interference.

In other embodiments, the phase noise mitigation platform 103 may impose the above-discussed "negative conjugate symmetry" condition during the estimation of the inter-carrier-interference coefficients as opposed to first estimating the coefficients and then doing the above averaging in equation (27).

By way of example, the UE 101, phase noise mitigation platform 103, and transmitter 107 communicate with each other and other components of the communication medium 105 using well known, new or still developing protocols. In this context, a protocol includes a set of rules defining how the network nodes within the communication medium 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application (layer 5, layer 6 and layer 7) headers as defined by the OSI Reference Model.

Figure 2:
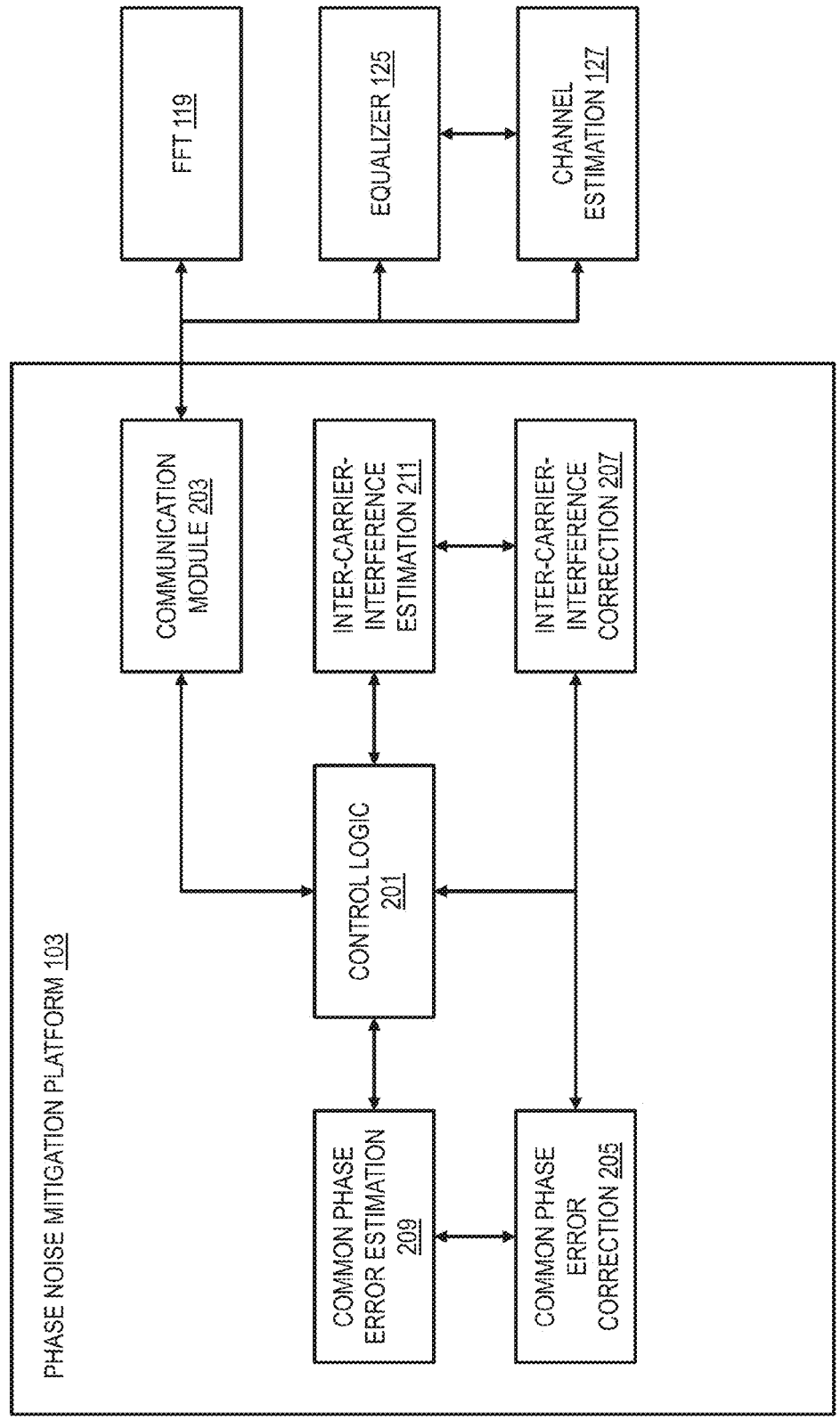
FIG. 2 is a diagram of the components of a phase noise mitigation platform configured to mitigate phase noise by correcting common phase error and inter-carrier-interference in a received signal, according to one embodiment.

FIG. 2 is a diagram of the components of the phase noise mitigation platform 103 according to one embodiment. In this embodiment, the phase noise mitigation platform 103 is configured to mitigate phase noise by correcting common phase error and inter-carrier-interference in a received signal. By way of example, the phase noise mitigation platform 103 includes one or more components for cancelling or at least mitigating inter-carrier-interference caused by phase noise in a received signal. It is contemplated that the functions of these components may be combined in one or more components or performed by other components of equivalent functionality.

In this embodiment, the phase noise mitigation platform 103 includes at least a control logic 201, a communication module 203, a common phase error correction module 205, an inter-carrier-interference correction module 207, a common phase error estimation module 209, and an inter-carrier-interference estimation module 211.

According to various embodiments, the communication module 203 receives the signal y(i), discussed above, from the FFT module 119. The FFT module 119, as discussed above. The control logic 201 instructs the common phase error estimation module 209 to determine the common phase error using the continuous pilots discussed above to estimate the common phase error and communicate the determined common phase error to the common phase error correction module 205 to compensate for the common phase error, as discussed above, with reference to at least equation (10).

The common phase error correction module 205 communicates an output to one or more of the inter-carrier-interference estimation module 211 and/or the inter-carrier-interference correction module 207. The control logic 201 then causes the inter-carrier-interference estimation module 211 to receive a channel estimate as shown in equation (16) and (17) above from the channel estimation module 127. A channel estimate from a previous OFDM symbol is then used here so as to not introduce any additional latency to system 100. It should be noted that because the inter-carrier-interference estimation module 211 needs only channel estimates for the pilot locations, any memory needed to store a previous channel estimate is minimal. The inter-carrier-interference estimation module 211 then estimates inter-carrier-interference coefficients as discussed above.

Alternatively, the control logic 201 may instruct the inter-carrier-interference estimation module 211 to apply any accuracy improvement or process simplification option discussed above, on demand, or based on available system resources, for example. Or, the control logic 201 may be configured to cause the inter-carrier-interference estimation module 211, or any other component of the phase noise mitigation platform 103 to function in a manner that is not adaptable to be changed based on determined system resources or any determinable economy settings, for example.

The estimated inter-carrier-interference coefficients are then communicate to the inter-carrier-interference correction module 207 to determine the inter-carrier-interference corrected data carriers in equation (25).

The control logic 201 then causes the inter-carrier-interference correction module 207 to communicate any determined inter-carrier-interference corrected data carriers $\{D(k) H(k)\}$ to one or more of the equalizer 125 and the channel estimation module 127 by way of the control logic 201 and the communication module 203.

The equalizer 125 then outputs an equalized data signal $\{D(k)\}$ after equalizing for the channel frequency response $\{H(k)\}$ is completed. The channel estimation module 127 then stores the channel estimate for pilot locations for a next phase noise mitigation cycle.

Figure 3:
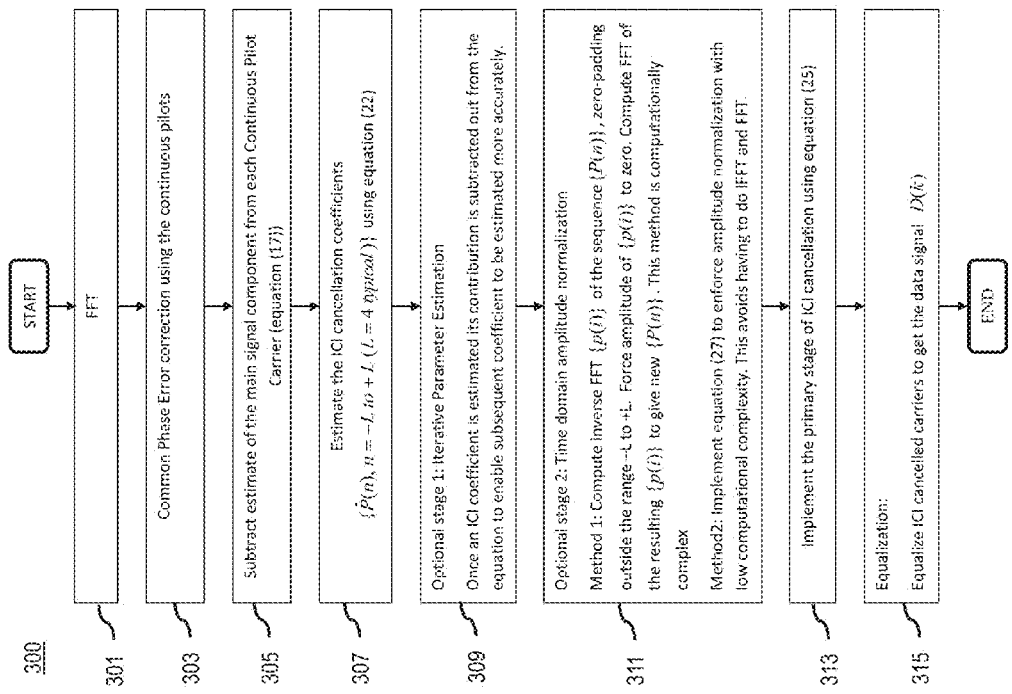
FIG. 3 is a flowchart of a process to mitigate phase noise by correcting common phase error and inter-carrier-interference in a received signal, according to one embodiment.
Figure 9:
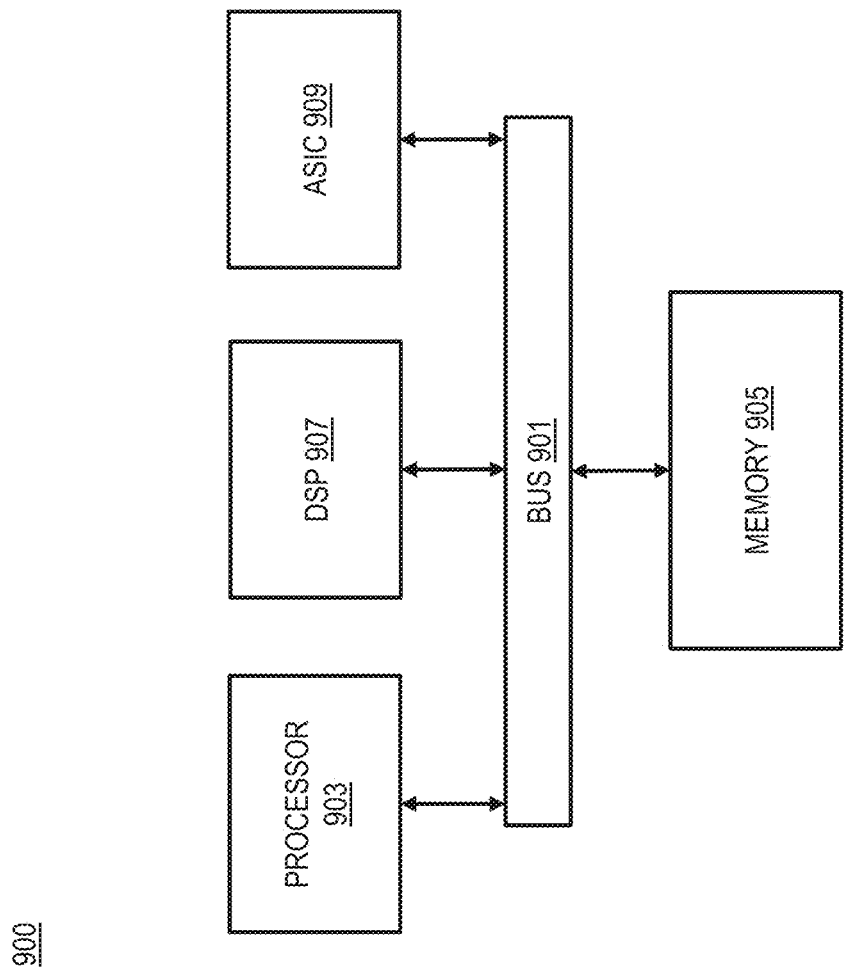
FIG. 9 is a diagram of a chip set that can be used to implement an embodiment.

FIG. 3 is a flowchart of a process to mitigate phase noise by correcting common phase error and inter-carrier-interference in a received signal, according to one embodiment. In one embodiment, the phase noise mitigation platform 103 performs the process 300 and is implemented in, for instance, a chip set including a processor and a memory as shown in FIG. 9. In step 301, the phase noise mitigation platform receives an OFDM data signal having been subjected to a Fast Fourier Transform by the FFT module 119 discussed above. The phase noise mitigation platform 103 may accordingly determine that the received OFDM signal includes phase noise comprising at least a common phase error component and an inter-carrier-interference component. Next, in step 303, the phase noise mitigation platform 103 causes, at least in part, the common phase error to be corrected based, at least in part, on one or more continuous pilot carriers.

Then, in step 305, the phase noise mitigation platform 103 causes, at least in part, an estimate of a main signal component to be subtracted from the one or more pilot carriers using equation (17). The process continues to step 307 in which the phase noise mitigation platform 103 determines a sequence of estimated coefficients of a multiplicative phase noise sequence using equation (22). As discussed above, the phase noise mitigation platform 103 may be configured to compensate for inter-carrier-interference by causing the first part of the sequence of estimated coefficients to include any number of coefficients such as being configured to accommodate at least two estimated coefficients, at least four estimated coefficients, or being specifically configured to accommodate any number of estimated coefficients in view of an accuracy preference or to sufficiently balance accuracy and system resource consumption.

Next, in step 309, the phase noise mitigation platform 103 determines the sequence of estimated coefficients by processing an estimated value of a first coefficient of the sequence of estimated coefficients to produce a result based on the first coefficient and subtracting the result when estimating a next coefficient of the sequence of estimated coefficients to hone in on an estimated value of the next coefficient.

Then in step 311, the phase noise mitigation platform 103 causes, at least in part, a unitary normalization of one or more respective units of each coefficient of the sequence of estimated coefficients to have a same unitary magnitude in a time domain. In embodiments, the phase noise mitigation platform 103 conducts the unitary normalization by causing, at least in part, the sequence of estimated coefficients to be subjected to an Inverse Fast Fourier Transform to generate an output sequence and enforce the unit magnitude property on this sequence, causing, at least in part, the output sequence to be subjected to a Fast Fourier Transform to generate a new sequence of estimated coefficients having the same unitary magnitude in the time domain, and causing, at least in part, the new sequence of estimated coefficients to be used in the inter-carrier-interference correction. Alternatively, the phase noise mitigation platform 103 may use equation (27) to enforce amplitude normalization with a low computational complexity so as to avoid performance of the Inverse Fast Fourier Transform and the Fast Fourier Transform discussed above.

The process continues to step 313 in which the phase noise mitigation platform 103 causes, at least in part, the inter-carrier-inference to be corrected by processing the multiplicative phase noise sequence using the sequence of estimated coefficients in equation (25). Next, in step 315, the phase noise mitigation platform 103 causes, at least in part, an equalized data signal to be output based, at least in part, on the corrected common phase error and the corrected inter-carrier-interference.

Figure 4:
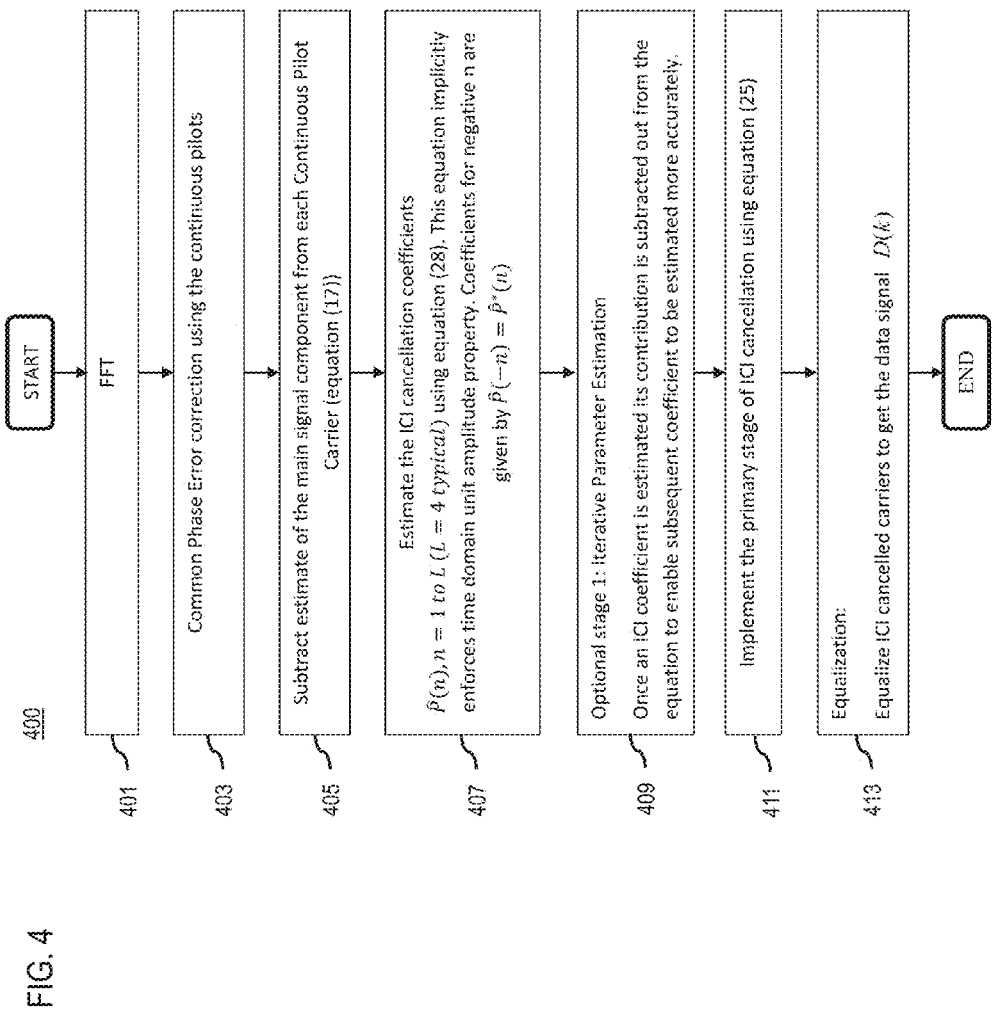
FIG. 4 is a flowchart of a process to mitigate phase noise by correcting common phase error and inter-carrier-interference in a received signal, according to one embodiment.

FIG. 4 is a flowchart of a process to mitigate phase noise by correcting common phase error and inter-carrier-interference in a received signal, according to one embodiment. In one embodiment, the phase noise mitigation platform 103 performs the process 400 and is implemented in, for instance, a chip set including a processor and a memory as shown in FIG. 9. In step 401, the phase noise mitigation platform receives an OFDM data signal having been subjected to a Fast Fourier Transform by the FFT module 119 discussed above. The phase noise mitigation platform 103 may accordingly determine that the received OFDM signal includes phase noise comprising at least a common phase error component and an inter-carrier-interference component. Next, in step 403, the phase noise mitigation platform 103 causes, at least in part, the common phase error to be corrected based, at least in part, on one or more continuous pilot carriers.

Then, in step 405, the phase noise mitigation platform 103 causes, at least in part, an estimate of a main signal component to be subtracted from the one or more pilot carriers using equation (17). The process continues to step 407 in which the phase noise mitigation platform 103 determines a sequence of estimated coefficients of a multiplicative phase noise sequence using equation (28). This sequence implicitly enforces a time domain unit amplitude property. In this embodiment, the phase noise mitigation platform 103 determines the estimated sequence of coefficients by determining a negative conjugate symmetry as given in equation (26) of a first part of the sequence of estimated coefficients to generate a second part of the sequence of estimated coefficients, and causing, at least in part, the sequence of estimated coefficients to include the first part and the second part of the sequence of estimated coefficients.

Next, in step 409, the phase noise mitigation platform 103 determines the sequence of estimated coefficients by processing an estimated value of a first coefficient of the sequence of estimated coefficients to produce a result based on the first coefficient and subtracting the result when estimating a next coefficient of the sequence of estimated coefficients to hone in on an estimated value of the next coefficient.

Then, in step 411, the phase noise mitigation platform 103 causes, at least in part, the inter-carrier-inference to be corrected by processing the multiplicative phase noise sequence using the sequence of estimated coefficients in equation (25). Next, in step 413, the phase noise mitigation platform 103 causes, at least in part, an equalized data signal to be output based, at least in part, on the corrected common phase error and the corrected inter-carrier-interference.

Figure 5:
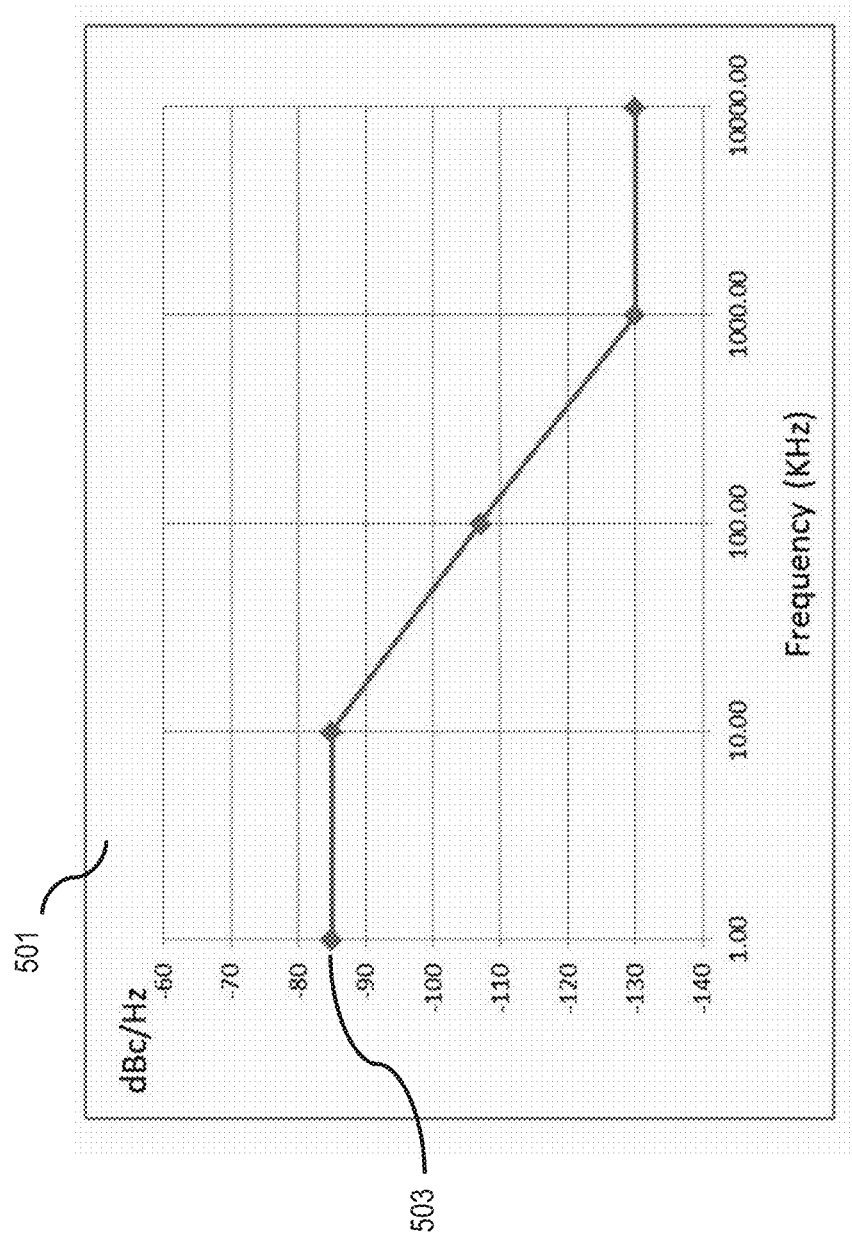
FIG. 5 is a graph illustrating a phase noise profile, according to one embodiment.

FIG. 5 is a graph illustrating an example form of a correctable phase noise power spectral density profile 501, according to one embodiment. Simulation results discussed below are for the phase noise profile shown in FIG. 5. For example, the phase noise profile 503 illustrates a conventional cable tuner power spectral density which is used for simplicity and discussion purposes to demonstrate the effects of inter-carrier-interference cancellation processes as implemented by the phase noise mitigation platform 103, discussed above. As previously noted, however, the phase noise mitigation platform 103 and the processes the phase noise mitigation platform 103 is configured to perform may be applicable for any number of received OFDM data signal coding rates, various communication mediums, wired or wireless, and any capable receiver UE 101, as discussed above.

Figure 6:
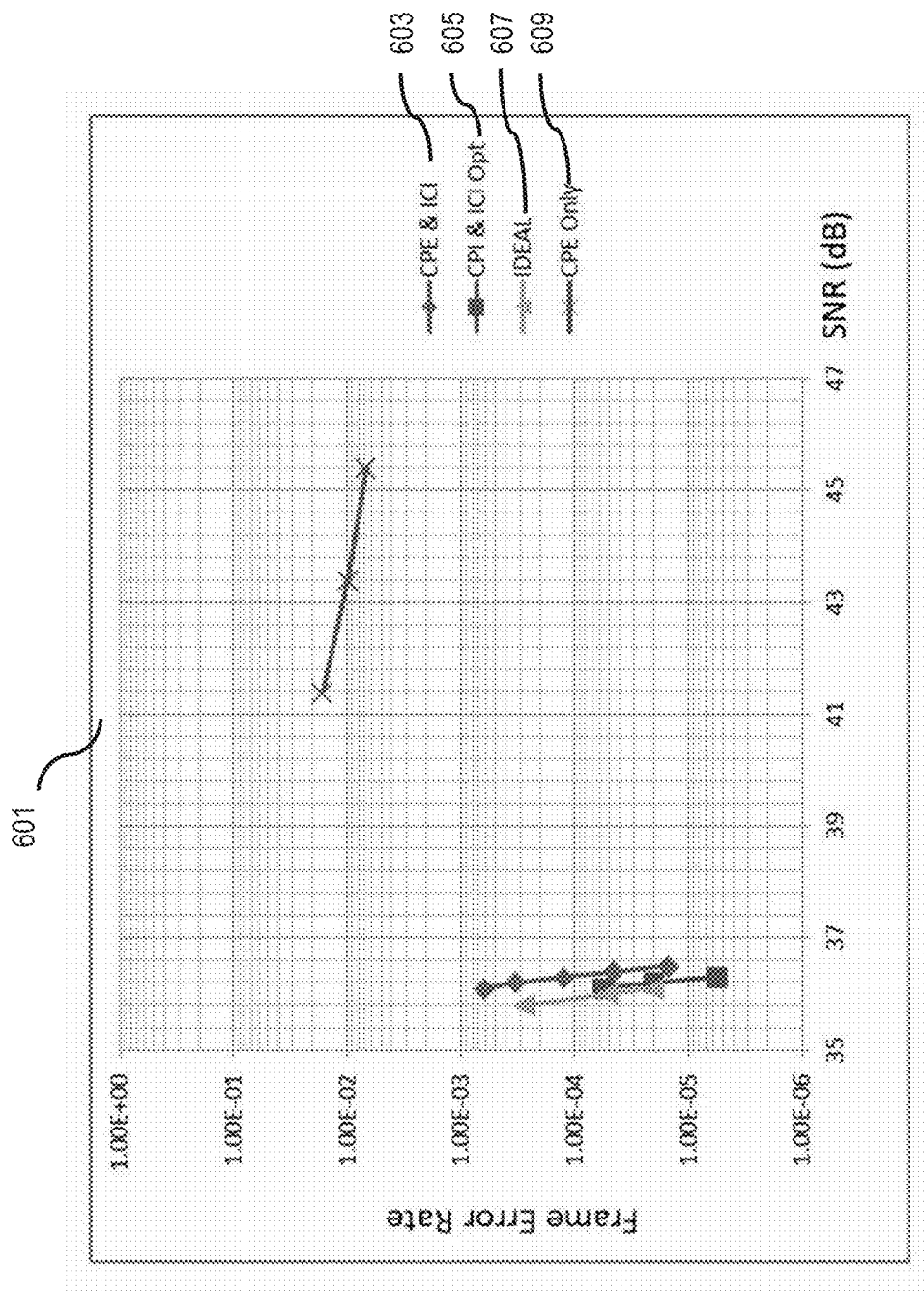
FIG. 6 is a graph illustrating the effectiveness of phase noise mitigation that includes common phase error correction and inter-carrier-interference correction, according to one embodiment.

FIG. 6 is a graph illustrating a comparison of frame error rate (PER) vs. signal to noise ratio (SNR) simulation results 601 to demonstrate the effectiveness of including inter-carrier-interference cancellation in phase noise mitigation. This example for correcting phase noise is based on the example OFDM subcarrier spacing of 12.5 kHz, QAM4096 modulation and forward error correction based on LDPC with code rate of 8/9 and assuming a phase noise profile as discussed above in FIG. 5. The results 601 illustrate phase noise mitigation performance for some of the embodiments discussed above.

For example, CPE & ICI plot 603 illustrates common phase error and inter-carrier-interference correction without the additional iterative parameter estimation and time domain amplitude normalization, discussed above. CPE & ICI plot 605 illustrates common phase error and inter-carrier-interference correction with the additional iterative parameter estimation and time domain amplitude normalization, discussed above. IDEAL plot 607 illustrates a best case scenario in which the inter-carrier-interference is canceled not through parameter estimation, but rather with knowledge of the exact phase noise sequence used in the simulation. IDEAL plot 607 is illustrated to show the effectiveness of the above discussed estimations conducted by the phase noise mitigation platform 103. Lastly, CPE Only plot 609 illustrates the effects of only compensating for the common phase error component of phase noise in the OFDM data signal to demonstrate the effectiveness of the additional inter-carrier-interference cancellation.

The horizontal axis of the graph illustrated in FIG. 6 is the channel SNR and the vertical axis is the Frame Error Rate (not Bit Error Rate) after the low density parity check (LDPC)-BCH decoding. The FFT size chosen in this example is 16K, and the symbol duration in this example is 80 ms with a carrier separation of 12.5 KHz. The LDPC code is the short code used in digital video broadcasting—cable standard DVB-C2. The block length in this example is 16200 bits and the code rate is 8/9. The BCH code is capable of correcting for 12 bit errors.

The phase error correction performance of QAM4096 illustrated in FIG. 6 with continuous phase correction alone, i.e. CPE Only plot 609, is very poor. As such, if only common phase error correction is applied to this example signal, it would not be possible to demodulate QAM4096 with common phase error correction only, if the phase noise profile is as given in 503, discussed above. This is because the noise floor caused by residual inter-carrier-interference is too high for the QAM4096 demodulation example described.

But, by cancelling the inter-carrier-interference in the example signal, as illustrated by plots 603, 605, and 607, the phase noise that occurs in the example signal is significantly reduced compared to CPE Only plot 609. This reduction occurs because both common phase error and inter-carrier-interference are canceled entirely or sufficiently mitigated. This, in turn, makes demodulation in this example possible.

Figure 7:
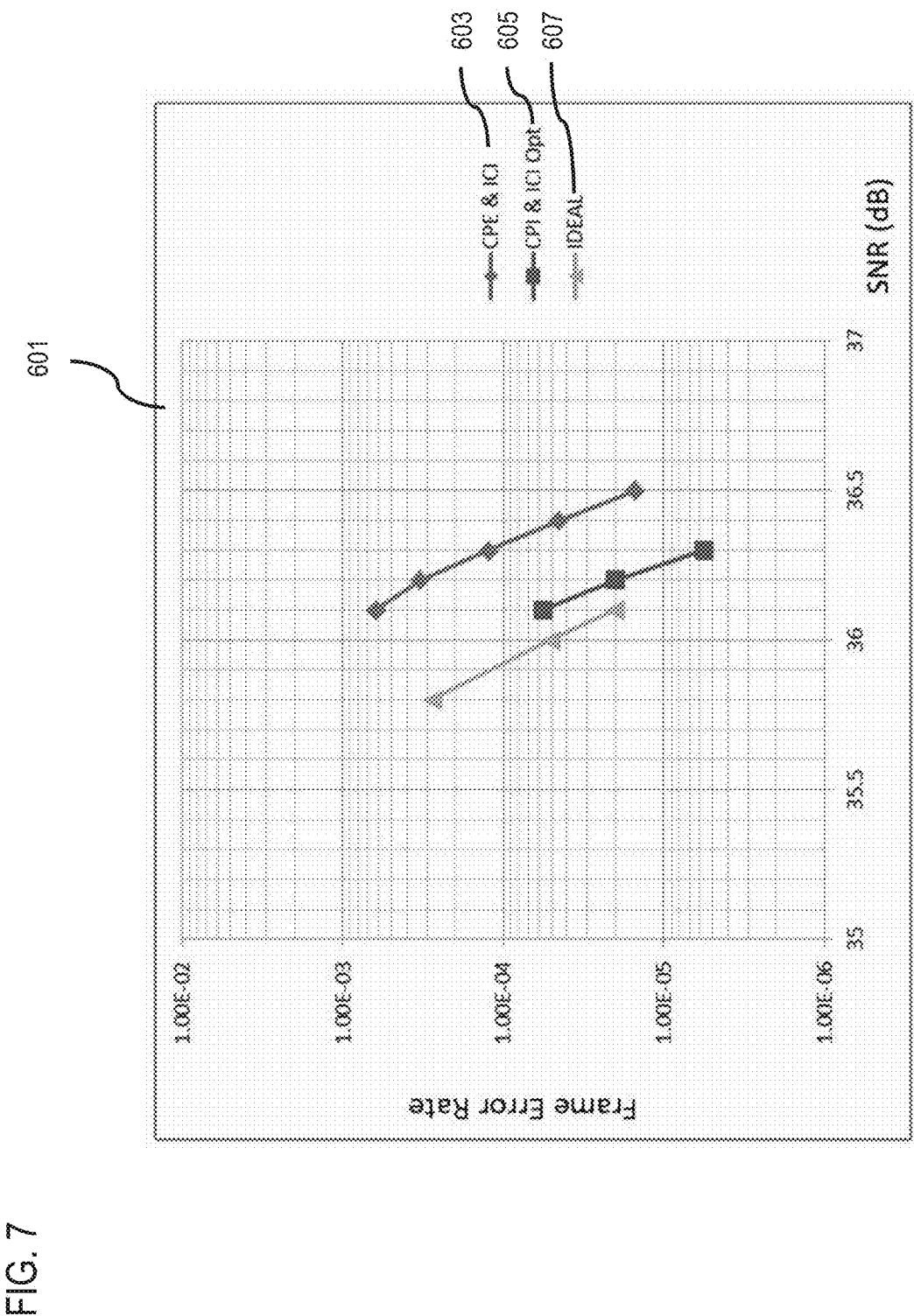
FIG. 7 is a graph illustrating the effectiveness of estimating inter-carrier-interference coefficients, according to one embodiment.

FIG. 7 is a graph illustrating a closer look at results 601 to demonstrate the effectiveness of estimating inter-carrier-interference coefficients using the algorithms discussed above.

As discussed above, IDEAL plot 607 is the best case scenario that can be achieved, because the inter-carrier-interference coefficients are known and not merely estimated. CPE & ICI plot 603 results in a phase noise mitigation performance that varies from the IDEAL plot 607 by about 0.4 dB. CPE & ICI Opt plot 605 results in a phase noise mitigation performance that varies from the IDEAL plot 607 by only 0.1 dB.

While both inter-carrier-interference cancellation example simulations are much more effective than compensating for common phase error alone, the ultimate determination of which inter-carrier-interference process the phase noise mitigation platform 103 is to apply depends on the benefit gained from improving SNR compared to the additional computational complexity required for achieving that determined benefit.

Figure 8:
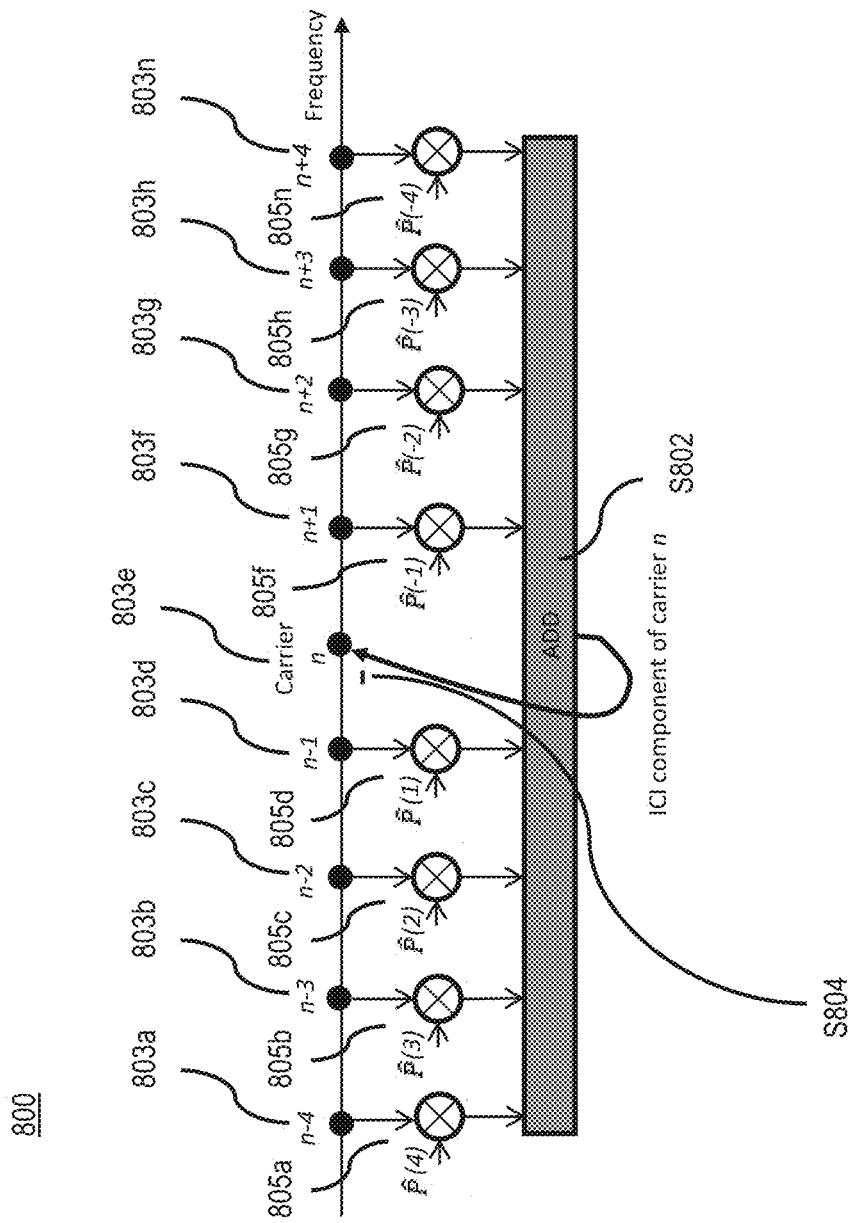
FIG. 8 is a block diagram illustrating a phase noise inter-carrier-interference mitigation filter.

FIG. 8 is a diagram of an inter-carrier-interference mitigation filter process such as that conducted by the phase noise mitigation platform 103 discussed above. In FIG. 8, a horizontal arrow 801 illustrates a frequency axis having subcarriers 803$a$-803$n$ (hereinafter referred to collectively as subcarrier 803). Any inter-carrier-interference affecting a subcarrier 803 in location a "n" is determined by summing the product between any adjacent subcarriers 803 and the corresponding estimated inter-carrier-interference phase noise coefficients 805$a$-805$n$ in step S802. Then the inter-carrier-interference summation is subtracted from the n'th carrier 803$e$ to obtain an inter-carrier-interference free n'th carrier 803$e$ in step S804, thereby canceling or at least mitigating the inter-carrier-interference component of phase noise based on the estimation phase noise coefficients 805$a$-805$n$.

The processes described herein for to mitigate phase noise by correcting common phase error and inter-carrier-interference in a received signal may be advantageously implemented via software, hardware, firmware or a combination of software and/or firmware and/or hardware. For example, the processes described herein, may be advantageously implemented via processor(s), Digital Signal Processing (DSP) chip, an Application Specific Integrated Circuit (ASIC), Field Programmable Gate Arrays (FPGAs), etc. Such exemplary hardware for performing the described functions is detailed below.

FIG. 9 illustrates a chip set or chip 900 upon which an embodiment may be implemented. Chip set 900 is programmed to mitigate phase noise by correcting common phase error and inter-carrier-interference in a received signal as described herein may include, for example, bus 901, processor 903, memory 905, DSP 907 and ASIC 909 components.

The processor 903 and memory 905 may be incorporated in one or more physical packages (e.g., chips). By way of example, a physical package includes an arrangement of one or more materials, components, and/or wires on a structural assembly (e.g., a baseboard) to provide one or more characteristics such as physical strength, conservation of size, and/or limitation of electrical interaction. It is contemplated that in certain embodiments the chip set 900 can be implemented in a single chip. It is further contemplated that in certain embodiments the chip set or chip 900 can be implemented as a single "system on a chip." It is further contemplated that in certain embodiments a separate ASIC would not be used, for example, and that all relevant functions as disclosed herein would be performed by a processor or processors. Chip set or chip 900, or a portion thereof, constitutes a means for performing one or more steps of mitigating phase noise by correcting common phase error and inter-carrier-interference in a received signal.

In one or more embodiments, the chip set or chip 900 includes a communication mechanism such as bus 901 for passing information among the components of the chip set 900. Processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-world signals (e.g., sound) in real time independently of the processor 903. Similarly, an ASIC 909 can be configured to performed specialized functions not easily performed by a more general purpose processor. Other specialized components to aid in performing the functions described herein may include one or more field programmable gate arrays (FPGA), one or more controllers, or one or more other special-purpose computer chips.

In one or more embodiments, the processor (or multiple processors) 903 performs a set of operations on information as specified by computer program code related to mitigating phase noise by correcting common phase error and inter-carrier-interference in a received signal. The computer program code is a set of instructions or statements providing instructions for the operation of the processor and/or the computer system to perform specified functions. The code, for example, may be written in a computer programming language that is compiled into a native instruction set of the processor. The code may also be written directly using the native instruction set (e.g., machine language). The set of operations include bringing information in from the bus 901 and placing information on the bus 901. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 903, such as a sequence of operation codes, constitute processor instructions, also called computer system instructions or, simply, computer instructions. Processors may be implemented as mechanical, electrical, magnetic, optical, chemical or quantum components, among others, alone or in combination.

The processor 903 and accompanying components have connectivity to the memory 905 via the bus 901. The memory 905 may include one or more of dynamic memory (e.g., RAM, magnetic disk, writable optical disk, etc.) and static memory (e.g., ROM, CD-ROM, etc.) for storing executable instructions that when executed perform the steps described herein. The memory 905 also stores the data associated with or generated by the execution of the steps.

In one or more embodiments, the memory 905, such as a random access memory (RAM) or any other dynamic storage device, stores information including processor instructions for mitigating phase noise by correcting common phase error and inter-carrier-interference in a received signal. Dynamic memory allows information stored therein to be changed by system 100. RAM allows a unit of information stored at a location called a memory address to be stored and retrieved independently of information at neighboring addresses. The memory 905 is also used by the processor 903 to store temporary values during execution of processor instructions. The memory 905 may also be a read only memory (ROM) or any other static storage device coupled to the bus 901 for storing static information, including instructions, that is not changed by the system 100. Some memory is composed of volatile storage that loses the information stored thereon when power is lost. The memory 905 may also be a non-volatile (persistent) storage device, such as a magnetic disk, optical disk or flash card, for storing information, including instructions, that persists even when the system 100 is turned off or otherwise loses power.

The term "computer-readable medium" as used herein refers to any medium that participates in providing information to processor 903, including instructions for execution. Such a medium may take many forms, including, but not limited to computer-readable storage medium (e.g., non-volatile media, volatile media), and transmission media. Non-volatile media includes, for example, optical or magnetic disks. Volatile media include, for example, dynamic memory. Transmission media include, for example, twisted pair cables, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, an EEPROM, a flash memory, any other memory chip or cartridge, a carrier wave, or any other medium from which a computer can read. The term computer-readable storage medium is used herein to refer to any computer-readable medium except transmission media.

While a number of embodiments and implementations have been described, the disclosure is not so limited but covers various obvious modifications and equivalent arrangements, which fall within the purview of the appended claims. Although features of various embodiments are expressed in certain combinations among the claims, it is contemplated that these features can be arranged in any combination and order.

What is claimed is:

1. A method comprising:
   determining a received signal includes phase noise comprising at least a common phase error component and an inter-carrier-interference component;
   causing, at least in part, the common phase error to be corrected based, at least in part, on one or more pilot carriers;
   causing, at least in part, an estimate of a main signal component to be subtracted from the one or more pilot carriers;
   determining a sequence of estimated coefficients of a multiplicative phase noise sequence, wherein the determination of the sequence of estimated coefficients comprises processing an estimated value of a first coefficient of the sequence of estimated coefficients to produce a result based on the first coefficient and subtracting the result when estimating a next coefficient of the sequence of estimated coefficients to hone in on an estimated value of the next coefficient;
   causing, at least in part, the inter-carrier-inference to be corrected by processing the multiplicative phase noise sequence using the sequence of estimated coefficients; and
   causing, at least in part, an equalized data signal to be output based, at least in part, on the corrected common phase error and the corrected inter-carrier-interference.

2. A method of claim 1, further comprising:
   causing, at least in part, a unitary normalization of one or more respective units of each coefficient of the sequence of estimated coefficients to have a same unitary magnitude in a time domain.

3. A method of claim 2, wherein the unitary normalization comprises:
   causing, at least in part, the sequence of estimated coefficients to be subjected to an Inverse Fast Fourier Transform to generate an output sequence and enforce the unitary magnitude on the output sequence;
   causing, at least in part, the output sequence to be subjected to a Fast Fourier Transform to generate a new sequence of estimated coefficients having the same unitary magnitude in the time domain; and
   causing, at least in part, the new sequence of estimated coefficients to be used in the inter-carrier-interference correction.

4. A method of claim 1, wherein the determination of the estimated sequence of coefficients comprises:
   determining a negative conjugate symmetry of a first part of the sequence of estimated coefficients to generate a second part of the sequence of estimated coefficients; and
   causing, at least in part, the sequence of estimated coefficients to include the first part and the second part of the sequence of estimated coefficients.

5. A method of claim 4, wherein the first part of the sequence of estimated coefficients includes at least four estimated coefficients.

6. A method of claim 1, wherein the sequence of estimated coefficients includes at least two estimated coefficients, the number of estimated coefficients being based, at least in part, on a determined system resource availability.

7. A method of claim 1, wherein the determination of the sequence of estimated coefficients is based, at least in part, on an equation $$\hat{P}(m) = \frac{\sum_{k \in S} \tilde{Y}(k) E^*(k-m)}{\sum_{k \in S} |E(k-m)|^2}.$$

8. A method of claim 1, further comprising:
   causing, at least in part, a unitary normalization of one or more respective units of each coefficient of the sequence of estimated coefficients to have a same unitary magnitude in a time domain,
   wherein the unitary normalization is based, at least in part, on an equation $$\hat{P}(k) = \frac{\hat{P}(k) - \hat{P}^*(-k)}{2}.$$

9. A method of claim 1, wherein the determination of the sequence of estimated coefficients is based, at least in part, on an equation $$\hat{P}(m) = \frac{\sum_{k \in S} [\tilde{Y}(k)E^*(k-m) - \tilde{Y}^*(k)E(k+m)]}{\sum_{k \in S} [|E(k-m)|^2 + |E(k+m)|^2]}.$$

10. An apparatus comprising:
at least one processor; and
at least one memory including computer program code for one or more programs,
the at least one memory and the computer program code configured to, with the at least one processor, cause the apparatus to perform at least the following,
determine a received signal includes phase noise comprising at least a common phase error component and an inter-carrier-interference component;
cause, at least in part, the common phase error to be corrected based, at least in part, on one or more pilot carriers;
cause, at least in part, an estimate of a main signal component to be subtracted from the one or more pilot carriers;
determine a sequence of estimated coefficients of a multiplicative phase noise sequence, wherein the determination of the sequence of estimated coefficients comprises processing an estimated value of a first coefficient of the sequence of estimated coefficients to produce a result based on the first coefficient and subtracting the result when estimating a next coefficient of the sequence of estimated coefficients to hone in on an estimated value of the next coefficient;
cause, at least in part, the inter-carrier-inference to be corrected by processing the multiplicative phase noise sequence using the sequence of estimated coefficients; and
cause, at least in part, an equalized data signal to be output based, at least in part, on the corrected common phase error and the corrected inter-carrier-interference.

11. An apparatus of claim 10, wherein the apparatus is further caused to:
cause, at least in part, a unitary normalization of one or more respective units of each coefficient of the sequence of estimated coefficients to have a same unitary magnitude.

12. An apparatus of claim 11, wherein the unitary normalization comprises:
causing, at least in part, the sequence of estimated coefficients to be subjected to an Inverse Fast Fourier Transform to generate an output sequence;
causing, at least in part, the output sequence to be subjected to a Fast Fourier Transform to generate a new sequence of estimated coefficients having the same unitary magnitude; and
causing, at least in part, the new sequence of estimated coefficients to be used in the inter-carrier-interference correction.

13. An apparatus of claim 10, wherein the determination of the estimated sequence of coefficients comprises:
determining a negative conjugate symmetry of a first part of the sequence of estimated coefficients to generate a second part of the sequence of estimated coefficients; and
causing, at least in part, the sequence of estimated coefficients to include the first part and the second part of the sequence of estimated coefficients.

14. An apparatus of claim 13, wherein the first part of the sequence of estimated coefficients includes at least four estimated coefficients.

15. An apparatus of claim 10, wherein the sequence of estimated coefficients includes at least two estimated coefficients, the number of estimated coefficients being based, at least in part, on a determined system resource availability.

16. An apparatus of claim 10, wherein the determination of the sequence of estimated coefficients is based, at least in part, on an equation $$\hat{P}(m) = \frac{\sum_{k \in S} \tilde{Y}(k)E^*(k-m)}{\sum_{k \in S} |E(k-m)|^2}.$$

17. An apparatus of claim 10, wherein the apparatus is further caused to:
cause, at least in part, a unitary normalization of one or more respective units of each coefficient of the sequence of estimated coefficients to have a same unitary magnitude in a time domain, the unitary normalization being based, at least in part, on an equation $$\hat{P}(k) = \frac{\hat{P}(k) - \hat{P}^*(-k)}{2}.$$

18. An apparatus of claim 10, wherein the determination of the sequence of estimated coefficients is based, at least in part, on an equation $$\hat{P}(m) = \frac{\sum_{k \in S} [\tilde{Y}(k)E^*(k-m) - \tilde{Y}^*(k)E(k+m)]}{\sum_{k \in S} [|E(k-m)|^2 + |E(k+m)|^2]}.$$

19. A non-transitory computer-readable storage medium carrying one or more sequences of one or more instructions which, when executed by one or more processors, cause an apparatus to:
determine a received signal includes phase noise comprising at least a common phase error component and an inter-carrier-interference component;
cause, at least in part, the common phase error to be corrected based, at least in part, on one or more pilot carriers;
cause, at least in part, an estimate of a main signal component to be subtracted from the one or more pilot carriers;
determine a sequence of estimated coefficients of a multiplicative phase noise sequence, wherein the determination of the sequence of estimated coefficients comprises processing an estimated value of a first coefficient of the sequence of estimated coefficients to produce a result based on the first coefficient and subtracting the result when estimating a next coefficient of the sequence of estimated coefficients to hone in on an estimated value of the next coefficient;
cause, at least in part, the inter-carrier-inference to be corrected by processing the multiplicative phase noise sequence using the sequence of estimated coefficients; and cause, at least in part, an equalized data signal to be output based, at least in part, on the corrected common phase error and the corrected inter-carrier-interference.

20. A non-transitory computer-readable storage medium of claim 19, wherein the apparatus is further caused to:
cause, at least in part, a unitary normalization of one or more respective units of each coefficient of the sequence of estimated coefficients to have a same unitary magnitude.

21. A non-transitory computer-readable storage medium of claim 20, wherein the unitary normalization comprises:
causing, at least in part, the sequence of estimated coefficients to be subjected to an Inverse Fast Fourier Transform to generate an output sequence;
causing, at least in part, the output sequence to be subjected to a Fast Fourier Transform to generate a new sequence of estimated coefficients having the same unitary magnitude; and
causing, at least in part, the new sequence of estimated coefficients to be used in the inter-carrier-interference correction.

22. A non-transitory computer-readable storage medium of claim 19, wherein the determination of the estimated sequence of coefficients comprises:
determining a negative conjugate symmetry of a first part of the sequence of estimated coefficients to generate a second part of the sequence of estimated coefficients; and
causing, at least in part, the sequence of estimated coefficients to include the first part and the second part of the sequence of estimated coefficients.

23. A non-transitory computer-readable storage medium of claim 22, wherein the first part of the sequence of estimated coefficients includes at least four estimated coefficients.

24. A non-transitory computer-readable storage medium of claim 19, wherein the sequence of estimated coefficients includes at least two estimated coefficients, the number of estimated coefficients being based, at least in part, on a determined system resource availability.

25. A non-transitory computer-readable storage medium of claim 19, wherein the determination of the sequence of estimated coefficients is based, at least in part, on an equation $$\hat{P}(m) = \frac{\sum_{k \in S} \tilde{Y}(k) E^*(k-m)}{\sum_{k \in S} |E(k-m)|^2}.$$

26. A non-transitory computer-readable storage medium of claim 19, wherein the apparatus is further caused to:
cause, at least in part, a unitary normalization of one or more respective units of each coefficient of the sequence of estimated coefficients to have a same unitary magnitude in a time domain, the unitary normalization being based, at least in part, on an equation $$\hat{P}(k) = \frac{\hat{P}(k) - \hat{P}^*(-k)}{2}.$$

27. A non-transitory computer-readable storage medium of claim 19, wherein the determination of the sequence of estimated coefficients is based, at least in part, on an equation $$\hat{P}(m) = \frac{\sum_{k \in S} \left[\tilde{Y}(k) E^*(k-m) - \tilde{Y}^*(k) E(k+m)\right]}{\sum_{k \in S} \left[|E(k-m)|^2 + |E(k+m)|^2\right]}.$$

* * * * *